No. 808,972. PATENTED JAN. 2, 1906.
G. W. CRANE.
SHREDDER FEEDER.
APPLICATION FILED JUNE 22, 1904.
2 SHEETS—SHEET 1.
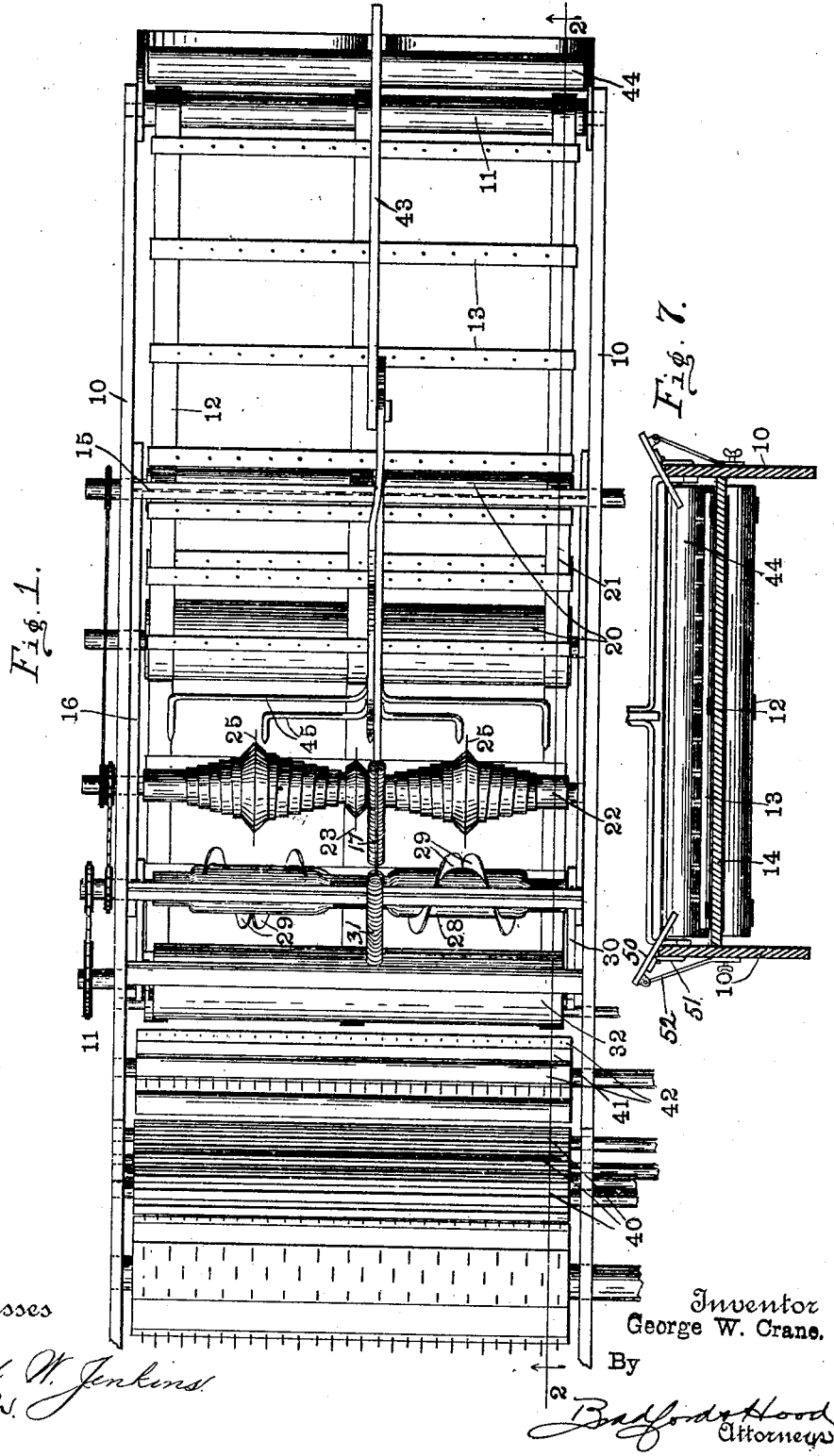
Witnesses
Fred W. Jenkins
J. A. Walsh
Inventor
George W. Crane.
By
Bradford Hood
Attorneys

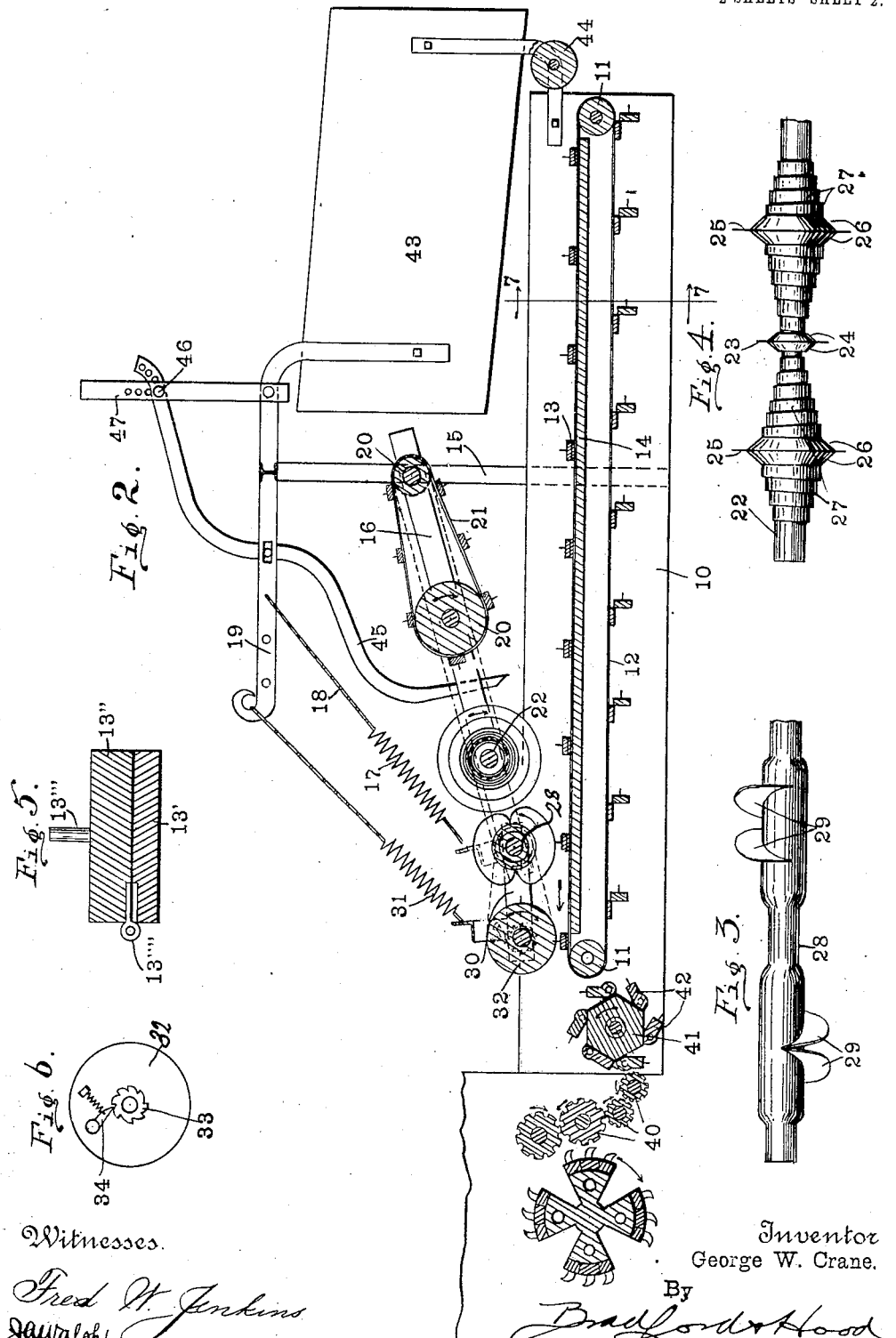

UNITED STATES PATENT OFFICE.

GEORGE W. CRANE, OF VEEDERSBURG, INDIANA.

SHREDDER-FEEDER.

No. 808,972.  Specification of Letters Patent.  Patented Jan. 2, 1906.

Application filed June 22, 1904. Serial No. 213,679.

*To all whom it may concern:*

Be it known that I, GEORGE W. CRANE, a citizen of the United States, residing at Veedersburg, in the county of Fountain and State of Indiana, have invented certain new and useful Improvements in Shredder-Feeders, of which the following is a specification.

The object of my invention is to provide improvements and details of construction in a feeder for corn shredders and huskers whereby the corn may be fed uniformly to the snapping and shredding mechanism.

The accompanying drawings illustrate my invention.

Figure 1 is a plan; Fig. 2, a section on line 2 2 of Fig. 1; Fig. 3, an elevation of the spreading-roller; Fig. 4, an elevation of the band-cutter roller; Fig. 5, a sectional detail of one of the endless-carrier slats; Fig. 6, a detail, and Fig. 7 a section on line 7 7 of Fig. 2.

In the drawings, 10 indicates the side portions of the feeder, at opposite ends of which are arranged suitable rollers 11, upon which is mounted the endless carrier 12, provided with cross-slats 13. The slats 13 are formed of a stationary lower member 13' and a swinging upper member 13'', provided with suitable teeth or pins 13'''. The member 13'' is hinged to the lower member along the forward edge by means of suitable hinges 13'''' for a purpose which will appear. The upper side of the endless carrier is supported, as usual, by means of a bottom 14, which extends between the sides 10.

Arranged above table 14 and pivoted at its rear end upon the upright 15 is a frame 16, which extends forward and downward and is supported at its forward end by means of a suitable spring-support 17, the upper end of the support being formed of a chain 18, which may be attached at any desired point in its length to an arm 19, carried by the uprights 15, the arrangement being such that by shortening or lengthening the chain 18 the distance between the forward end of frame 16 and the table 14 may be regulated. Mounted in the rear end of frame 16 are two rollers 20, over which extends a raddle or endless carrier 21, driven in the direction indicated by the arrows and serving to hold material down upon the carrier 12. Immediately in front of roller 20 and journaled in the frame 16 is the band-cutter roller or drum 22. This drum carries at its center a disk knife 23, flanked on each side by a tapered collar 24. Arranged on each side of the disk knife 23 is a similar but somewhat larger knife 25, which is flanked on each side by a tapered collar 26, each knife 25 being arranged about half-way between the knife 23 and one of the sides 10. Leading from each collar 26 is a decreasing tapered spiral 27, which serves to engage the stalks and spread them in opposite directions from the cutter 25, the cutter 23, however, preventing the stalks from becoming crossed in the center. Journaled in frame 16 in front of roller 22 is a spreading-roller 28, which is provided about in line with knives 25 with a pair of spreading-wings 29, which also serve to engage the stalks and spread them evenly over the table 14.

Pivoted upon the forward end of frame 16 is a frame 30, the forward free end of which is supported by an adjustable spring-support 31, at the upper end of which is a chain, which may be attached at any desired point in its length to the forward end of arm 19. Journaled in the forward free end of frame 30 is a pressure-roller 32, which is driven by a suitable ratchet connection, such as that shown in Fig. 6. As shown, the ratchet-wheel 33 is carried by a shaft driven by any suitable train of gearing, and the spring-pawl 34 is carried by the pressure-roller 32, the arrangement being such that the roller may be driven in the direction indicated by the arrow or may be advanced more rapidly than the driving means, as will be described later.

The endless carrier 12 drives the stalks toward the snapping-rollers 40, and in order to assist in the delivery of the stalks thereto I arrange between them and the inner end of the carrier 12 a drum 41, which is provided on its periphery with a plurality of finger-bars 42, each of which is pivoted on an axis parallel with the axis of the drum and capable of limited swinging movement, whereby when the feeding-fingers have reached a certain point in the advanced rotation said fingers will successively drop away from the fodder and leave it free.

Supported from the frame 15 and extending from thence to the rear over carrier 12 is a divider-board 43, which serves to prevent fodder thrown onto the feeder from opposite sides from becoming tangled at the center.

Supported above the rear end of the carrier 12 is a roller 44, which renders it impossible for the operators to get the top ends of the fodder onto the table before the butt ends are engaged.

Pivoted upon the arm 19 is a retarding-rake 45, the fingers of which project down between roller 20 and the cutter-roller 22 to prevent too much material from passing forward at one time. This retarding-rake may be adjusted toward and from the carrier 12 and held in any desired position by a suitable adjustable connection 46, with a stationary standard 47 supported by the standards 15.

In operation the carrier 12, raddle 20, cutter-roller 22, spreader-roller 28, pressure-roller 32, and the transferring-drum 41 are driven in the directions indicated by the arrows by any suitable driving means, preferably a reversing driving means such as that shown in my Patent No. 740,245. The snapping-rollers and the shredder-head are also driven in the directions indicated by the usual means. The pressure-roller 32 and the carrier 12 are driven at the same lineal speed, while the rollers 20, cutter-roller 22, and spreader-roller 28 are preferably driven a little faster. As the fodder is thrown upon the carrier 12 the tops are supported by the roller 44 until the butt-ends are entered well under the raddle 21, and this raddle serves to hold the bundle down upon the carrier. The lower portions of the bundle are engaged by the slats 13 and driven forward beneath the cutter-roller 22, which serves to cut the band and to spread the fodder evenly over the carrier, and the fodder is further spread by roller 28. The frame 16 yields as the fodder passes beneath the several rollers; but the retarding-rake 45 prevents a passage of too great an amount of fodder, and the pressure-roller 32 holds the fodder down upon the carrier 12. When the butt-ends of the fodder pass from the carrier 12, they are engaged by the bars 42 in succession, and these bars serve to direct the fodder to one or the other pair of snapping-rollers 40. The snapping-rollers move preferably somewhat more rapidly than the carrier 12, so that when the butt-ends of the fodder are engaged by the snapping-rollers the fodder begins to move more rapidly than the carrier. In order to allow for this difference, the hinged portions 13" of each slat are free to yield as it passes from under the pressure-roller 32, and the pressure-roller 32 is also free to be pulled forward more rapidly than its driving mechanism is moving, thus operating to keep the throat of the snapping-rollers free.

In order to regulate the capacity of the fodder I arrange upon each side 10 a hinged guard-board 50 by hinges 51, and each of these guard-boards is held in any desired position of adjustment by means of a suitable brace 52, pivoted on the guard-board.

I claim as my invention—

1. In a feeder for shredders, the combination, with an endless carrier, of a pressure-roller journaled above said carrier and coöperating therewith, and a ratchet driving connection for said pressure-roller yieldable in the direction of feed, for the purpose set forth.

2. In a feeder for shredders, the combination, with an endless carrier provided with material-engaging means yieldable in the direction of movement of the carrier, a pressure-roller journaled above said carrier and coöperating therewith, and a ratchet driving connection for said roller yieldable in the direction of the movement of the carrier.

3. In a feeder for shredders, the combination, with an endless carrier, of a frame pivoted at one end above said carrier and extending downward and forward, an adjustable yielding support for the forward end of said frame, a pair of rollers journaled in said frame at its rear end, a raddle arranged over said rollers, a band-cutter roller journaled in said frame in front of said raddle, a spreader-roller journaled in said frame in front of the band-cutter roller, a supplemental frame pivoted to the forward free end of the first-mentioned frame, a yielding adjustable support for the free end of said supplemental frame, and a pressure-roller journaled in the forward end of said supplemental frame.

4. In a feeder for shredders, the combination, with an endless carrier, of a feeding-carrier arranged above said endless carrier and movable toward and from said endless carrier, band-cutting mechanism arranged above the carrier in advance of said feeding-carrier, and a retarding-rake independent of and arranged between said feeding-carrier and said band-cutting mechanism and projecting toward the endless carrier.

In witness whereof I have hereunto set my hand and seal, at Veedersburg, Indiana, this 17th day of June, A. D. 1904.

GEORGE W. CRANE. [L. S.]

Witnesses:
E. A. HUFF,
THOMAS MILLER.